(12) United States Patent
Takeda et al.

(10) Patent No.: US 6,504,809 B1
(45) Date of Patent: Jan. 7, 2003

(54) DRIVING APPARATUS AND METHOD FOR RECORDING MEDIUM

(75) Inventors: Koji Takeda, Gunma (JP); Hideo Sekiguchi, Gunma (JP); Yoshimori Tajima, Gunma (JP)

(73) Assignee: NEC Corporation, Tokyo (JP)

( * ) Notice: Subject to any disclaimer, the term of this patent is extended or adjusted under 35 U.S.C. 154(b) by 374 days.

(21) Appl. No.: 09/597,090

(22) Filed: Jun. 20, 2000

(30) Foreign Application Priority Data

Jun. 21, 1999 (JP) .......................................... 11-174727

(51) Int. Cl.⁷ .............................................. G11B 33/02
(52) U.S. Cl. .................................... 369/77.2; 360/99.06
(58) Field of Search ............................... 369/77.2, 77.1, 369/75.2, 78.1; 360/99.07, 99.06, 99.03, 99.02, 98.06, 133

(56) References Cited

FOREIGN PATENT DOCUMENTS

| JP | 5-47093 | | 2/1993 |
| JP | 08321114 | * | 12/1996 |
| JP | 2690710 | | 8/1997 |

* cited by examiner

*Primary Examiner*—David Hudspeth
*Assistant Examiner*—Angel Castro
(74) *Attorney, Agent, or Firm*—Sughrue Mion, PLLC

(57) ABSTRACT

A driving apparatus for a recording medium, wherein the recording medium is accommodated within a case, the case is adapted so that slanting sections are constructed at both end sections in a front end section that is on a side of insertion into the driving apparatus, and in the driving apparatus, stoppers for preventing error insertion are provided in correspondence with the slanting sections of the case, which are constructed at the both end sections in the front end section, and the stoppers are constructed so that, in case that the case in which the slanting sections are constructed at the both end sections in the front end section is inserted into the driving apparatus, the stoppers are subject to release action by means of the slanting sections of the both end sections in the front end section of the case, and permit insertion of the case, and in case that a case in which slanting sections are not constructed at least one end section in a front end section is inserted, the stoppers cannot be subject to release action by means of the slanting sections, and do not permit insertion of the case.

23 Claims, 3 Drawing Sheets

DRIVING APPARATUS AND METHOD FOR RECORDING MEDIUM

BACKGROUND OF THE INVENTION

The present invention relates to a driving apparatus for recording and/or reproduction and so forth, and particularly, to a driving apparatus wherein, for a type in which a recording medium is accommodated within a case being adapted so that slanting sections are constructed at both end sections in a front end section that is on a side of insertion into the driving apparatus, recording and/or reproduction is conducted.

Conventionally, several kinds of recording media were proposed. For example, a floppy disk of a 3.5 inch size is accommodated within a flat case made of plastic. In this case, a slanting section is constructed only at an end section on one side in a front end section that is on a side of insertion into a driving apparatus for recording and/or reproduction (also simply referred to as a recording and reproducing apparatus, hereinafter). And, in case that the above-described case is inserted into the recording and reproducing apparatus, a function of a stopper disposed in the recording and reproducing apparatus is released by means of the slanting section disposed only at the end section on one side in the front end section of the above-described case, and the insertion becomes possible. Accordingly, in case that a case in which a slanting section is not constructed is inserted, since the function of the stopper disposed in the recording and reproducing apparatus is not released, the insertion becomes impossible.

For a mechanism for preventing such an error insertion, several kinds of technologies were proposed. For example, there is a technology disclosed in the specification of JP-B-2690710. Further, the technologies are also disclosed in the publication of JP-A-47093/1993 and so forth.

On the other hand, a medium of a type called a ZIP was proposed. This type of medium has a feature in a point that slanting sections are constructed at both end sections in a case front end section that is on a side of insertion into a recording and reproducing apparatus. In other words, the medium of the type called a ZIP has a feature also in a case that accommodates the medium.

By the way, inconvenience is expected to occur when a floppy disk of 3.5 inches is inserted into a recording and reproducing apparatus in which the ZIP can be used, and recording and/or reproducing operation is conducted.

Therefore, a task to be solved by the present invention is to, even though the floppy disk of 3.5 inches is inserted into the recording and reproducing apparatus in which the ZIP can be used, make the insertion imperfect and make it impossible to use the floppy disk.

In addition, in a recording and reproducing apparatus in which the technologies for preventing error insertion, which are described in the specification of JP-B-2690710 and the publication of JP-A-47093/1993, are only adopted, since, basically, it is possible to insert the floppy disk of 3.5 inches into the apparatus, the above-described task to be solved by the present invention cannot be solved.

SUMMARY OF THE INVENTION

The objective of the present invention is to solve the above-described task.

The objective of the present invention is accomplished by a driving apparatus for a recording medium, wherein the above-described recording medium is accommodated within a case, the above-described case is adapted so that slanting sections are constructed at both end sections in a front end section that is on a side of insertion into the above-described driving apparatus, and in the above-described driving apparatus, stoppers for preventing error insertion are provided in correspondence with the above-described slanting sections of the above-described case, which are constructed at the above-described both end sections in the above-described front end section, and the above-described stoppers are constructed so that, in case that the above-described case in which the above-described slanting sections are constructed at the above-described both end sections in the above-described front end section is inserted into the above-described driving apparatus, the above-described stoppers are subject to release action by means of the above-described slanting sections of the above-described both end sections in the above-described front end section of the above-described case, and permit insertion of the above-described case, and in case that a case in which slanting sections are not constructed at least one end section in a front end section is inserted, the above-described stoppers cannot be subject to release action by means of the above-described slanting sections, and do not permit insertion of the above-described case.

Also, the objective of the present invention is accomplished by a driving method for a recording medium accommodated within a case. The above-described case is adapted so that slanting sections are constructed at both end sections in a front end section that is on a side of insertion into a driving apparatus. The above-described method includes steps of: providing stoppers for preventing error insertion, in correspondence with the above-described slanting sections of the above-described case; and in case that the above-described case is inserted into the above-described driving apparatus, and the above-described stoppers are subject to release action by means of the above-described slanting sections of the above-described both end sections in the above-described front end section of the above-described case, permitting insertion of the above-described case, and in case that a case in which slanting sections are not constructed at least one end section in a front end section is inserted, and the above-described stoppers cannot be subject to release action by means of the above-described slanting sections, prohibiting insertion of the above-described case.

In accordance with the above-described arrangements, in other words, if a feature of the case is utilized, in which the slanting sections are constructed at the both end sections in the front end section that is on a side of insertion into the driving apparatus, and if, in the driving apparatus, the stoppers for preventing error insertion are provided in correspondence with the slanting sections which are constructed at the both end sections in the front end section of the above-described case, the insertion is permitted in case of a so called ZIP type. In a usual floppy disk of 3.5 inches, however, while release of one stopper is made, release of the other stopper is not made. Accordingly, the floppy disk of 3.6 inches cannot be inserted.

The stoppers for preventing error insertion, which are provided in the above-described driving apparatus, are formed of an elastic rebound member, for example. Especially, the stoppers are constructed so that, in case that the case in which the slanting sections are constructed at the both end sections in the front end section is inserted, both end sections of the above-described elastic rebound stoppers are subject to force opposed to elastic rebound force by means of the slanting sections at the both end sections in the front end section of the above-described case, and are displaced, and insertion of the above-described case is permitted, and in case that a case in which slanting sections are not constructed at least one end section in a front end section is inserted, at least one end section of the above-described elastic rebound stoppers is not displaced, and insertion of the above-described case is not permitted.

If the stoppers are explained more particularly, the stoppers are generally formed in a shape of a letter V, for example. And, the stoppers are constructed so that the both end sections thereof are displaced in an outside direction on both sides of the above-described case to a direction of insertion of the case into the-driving apparatus. Otherwise, the stoppers are constructed so that the both end sections thereof are displaced in an upper or a lower direction to a surface of the case to be inserted into the driving apparatus.

Also, not only to simply provide the stoppers, but also in order to make the operation of the displacement of the stoppers smooth, it is preferable that, in case that the case in which the slanting sections are constructed at the both end sections in the front end section is inserted into the driving apparatus, when the both end sections of the stoppers are subject to force opposed to elastic rebound force by means of the slanting sections at the both end sections in the front end section of the above-described case, and are displaced, guide means for guiding displacement of the both end sections of the stoppers is formed.

As the above-described guide means, for example, grooves formed in a direction intersecting to a direction of insertion of the case into the driving apparatus are stated. In other words, by placing within the grooves the both end sections of the elastic rebound stoppers that are generally formed in a shape of a letter V, the both end sections of the stoppers are pushed by the inserted case, and the stoppers are displaced while being guided along the grooves, and the insertion of the case becomes permitted.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Figure 1:
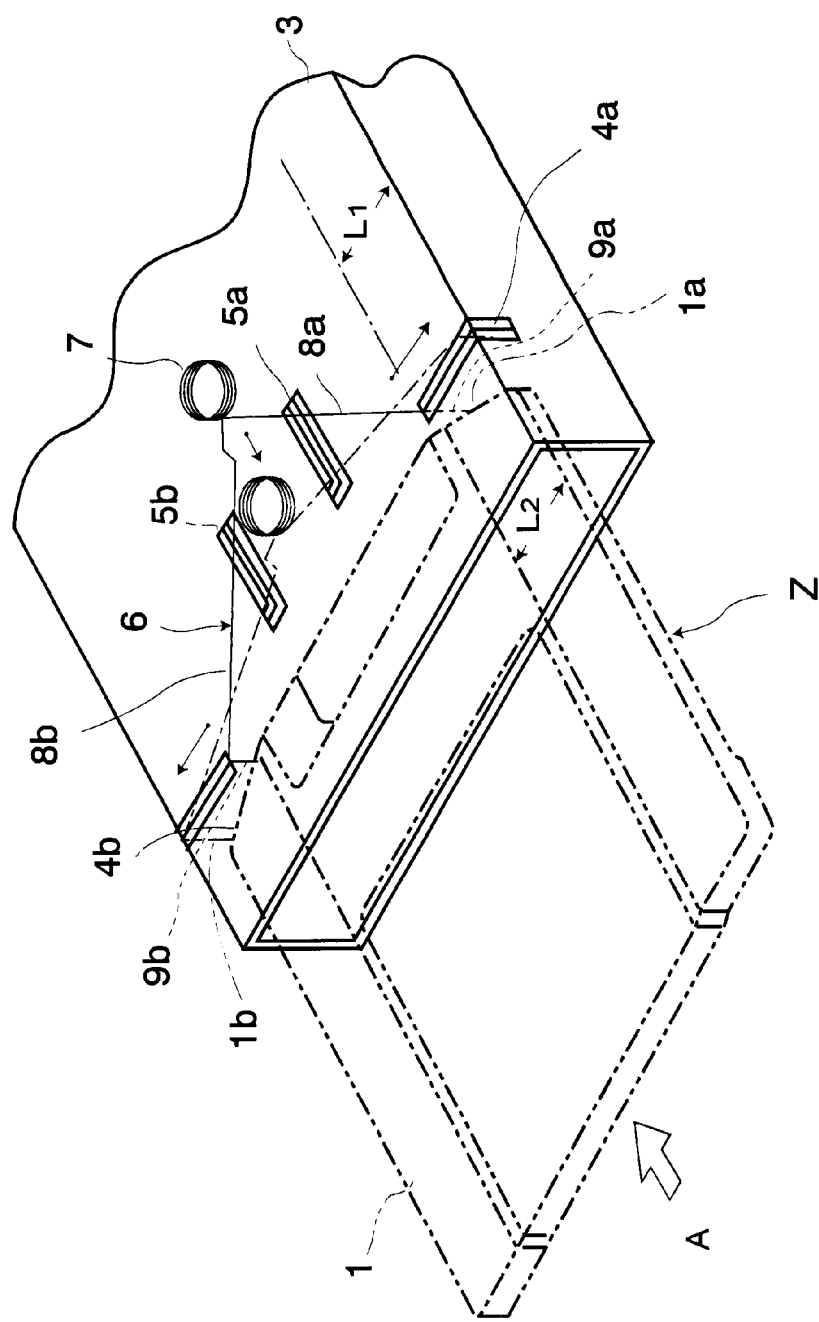
FIG. 1 is a schematic oblique view showing a first embodiment of the present invention during insertion of a ZIP.

A driving apparatus for a recording medium in accordance with the present invention is a driving apparatus for driving a recording medium (a recording medium in the shape of a disc), wherein the above-described recording medium is accommodated within a case, and the above-described case is adapted so that slanting sections are constructed at both end sections in a front end section that is on a side of insertion into the above-described driving apparatus, and in the above-described driving apparatus, stoppers for preventing error insertion are provided in correspondence with the above-described slanting sections of the above-described case, which are constructed at the both end sections in the front end section, and the above-described stoppers are constructed so that, in case that the above-described case in which the slanting sections are constructed at the both end sections in the front end section is inserted into the above-described driving apparatus, the stoppers are subject to release action by means of the slanting sections of the both end sections in the front end section of the above-described case, and permit insertion of the above-described case, and in case that a case in which slanting sections are not constructed at least one end section in a front end section is inserted, the stoppers cannot be subject to release action by means of the above-described slanting sections, and do not permit insertion of the above-described case. The above-described stoppers for preventing error insertion are formed of an elastic rebound member (a spring such as a helical torsion coil spring), for example. Especially, the stoppers are constructed so that, in case that the case in which the slanting sections are constructed at the both end sections in the front end section is inserted, both end sections of the above-described elastic rebound stoppers are subject to force opposed to elastic rebound force by means of the slanting sections at the both end sections in the front end section of the above-described case, and are displaced, and insertion of the above-described case is permitted, and in case that a case in which slanting sections are not constructed at least one end section in a front end section is inserted, at least one end section of the above-described elastic rebound stoppers is not displaced, and insertion of the above-described case is not permitted. If the stoppers are explained more particularly, the stoppers are generally formed in a shape of a letter V, for example. And, the stoppers are constructed so that the both end sections thereof are displaced in an outside direction on both sides of the above-described case to a direction of insertion of the case into the driving apparatus. Otherwise, the stoppers are constructed so that the both end sections thereof are displaced in an upper or a lower direction to a surface of the case to be inserted into the driving apparatus. Also, in order to make the operation of the displacement of the stoppers smooth, in case that the case in which the slanting sections are constructed at the both end sections in the front end section is inserted into the driving apparatus, when the both end sections of the stoppers are subject to force opposed to elastic rebound force by means of the slanting sections at the both end sections in the front end section of the above-described case, and are displaced, guide means for guiding displacement of the both end sections of the stoppers is formed. As the guide means, for example, grooves formed in a direction intersecting to a direction of insertion of the case into the driving apparatus are stated. In other words, by placing within the grooves the both end sections of the elastic rebound stoppers that are generally formed in a shape of a letter V, the both end sections of the stoppers are pushed by the inserted case, and the stoppers are displaced while being guided along the grooves, and the insertion of the case becomes permitted.

Below, the present invention will be explained further in detail.

Figure 2:
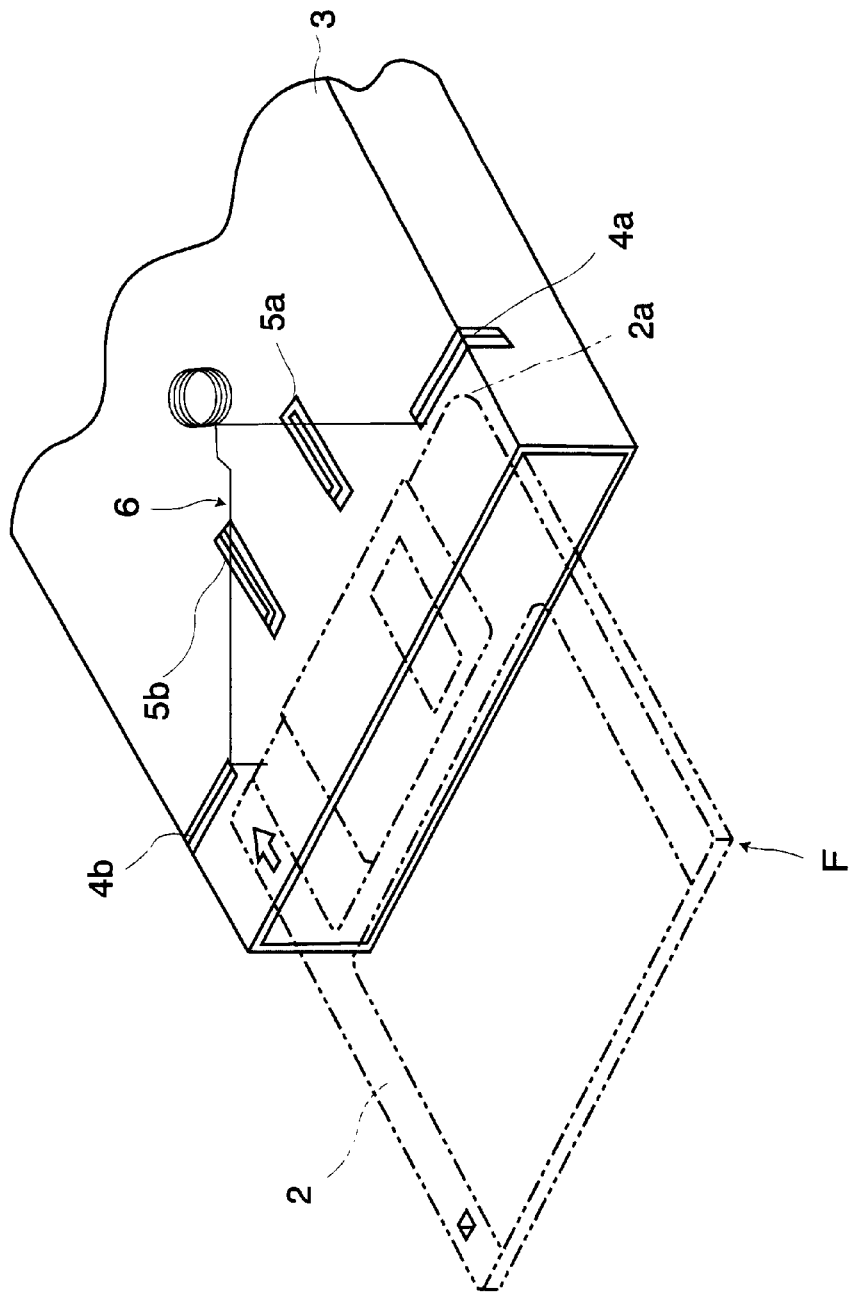
FIG. 2 is a schematic oblique view showing a first embodiment of the present invention during insertion of a floppy disk.

FIG. 1 and FIG. 2 are schematic oblique views showing main parts of a first embodiment of a driving apparatus for a recording medium in the shape of a disc, which is related to the present invention, and FIG. 1 is for explaining a case in which a ZIP is inserted into the driving apparatus of the present invention, and in the ZIP, media are accommodated within a case in which slanting sections are constructed at both end sections in a front end section that is on a side of insertion into the driving apparatus, and FIG. 2 is for explaining a case in which a floppy disk of 3.5 inches is inserted into the driving apparatus of the present invention, and in the floppy disk, media are accommodated within a case in which a slanting section is constructed only at one end section in a front end section that is on a side of insertion into the driving apparatus.

In each figure, Z indicates the ZIP, and F indicates the floppy disk.

Apparent from FIG. 1, in a case 1 of the above-described ZIP, slanting sections 1a and 1b are constructed at both end sections on both sides in a front end section that is on a side (in FIG. 1, on a right side) of insertion into the driving apparatus. It would be noted that, since details of the ZIP are already well known, explanation of the details is omitted.

Apparent from FIG. 2, in a case 2 of the above-described floppy disk, a slanting section 2a is constructed at an end section on a right side in a front end section that is on a side (in FIG. 2, on a right side) of insertion into the driving apparatus. It would be noted that, since details of this floppy disk are already well known, explanation of the details is omitted.

A reference numeral 3 is an insertion section into which the ZIP in a recording and reproducing apparatus (a driving apparatus) that is used in recording and reproduction of the ZIP. The ZIP is inserted into this insertion section 3, and by applying a predetermined operation, the recording and reproduction are conducted. Also, with regard to the recording and reproducing operation, since an outline thereof is the same as a conventional operation, detailed explanation thereof is omitted.

Grooves 4a and 4b are provided from a top surface section to a side surface section of the insertion section 3 along a direction orthogonal to a ZIP insertion direction (a direction of an arrow A). A length $L_1$ of the grooves 4a and 4b in the top surface section from the side surface section is shorter than a length $L_2$ in a right and left direction in a region of the slanting sections 1a and 1b of the case 1, when the case 1 is inserted into the insertion section 3. Also, hook sections 5a and 5b for hooking are provided in the top surface section of the insertion section 3.

A reference numeral 6 is a helical torsion coil spring. This helical torsion coil spring 6 has a center coil section 7, arm sections 8a and 8b extending from the coil section 7 generally in the shape of a letter V, and bend sections 9a and 9b in which tip sections of the arm section 8a and 8b are bent to a lower side.

And, the helical torsion coil spring 6 is hooked so that the bend sections 9a and 9b of the helical torsion coil spring 6 are positioned within the grooves 4a and 4b, and the arm sections 8a and 8b of the helical torsion coil spring 6 are not detached from the top surface section of the insertion section 3 by means of the hook sections 5a and 5b.

Under an arrangement as described above, as shown in FIG. 1, when the ZIP is inserted into the insertion section 3, the slanting sections 1a and 1b of the both end sections on both sides in the front end section of the case 1 exist in positions corresponding to the slanting sections 1a and 1b without fail, and push the bend sections 9a and 9b positioned within the grooves 4a and 4b to right and left, respectively. In other words, by means of the slanting section 1a of the case 1, the bend section 9a of the helical torsion coil spring 6 is introduced into the groove 4a and is pushed to a right side of the case 1. At the same time, by means of the slanting section 1b of the case 1, the bend section 9b of the helical torsion coil spring 6 is introduced into the groove 4b and is pushed to a left side of the case 1. As a result, since components for blocking the insertion of the case 1 are excluded from an inside of the insertion section 3, the case 1 can be pushed into the insertion section 3. It would be noted that, in FIG. 1, a locus of the displacement of the helical torsion coil spring 6 is shown by an alternate long and short dash line.

However, as shown in FIG. 2, in case that the floppy disk is inserted, the insertion thereof is blocked. In other words, in the case 2 of the floppy disk, although the slanting section 2a is constructed at the end section on a right side in the front end section thereof, a slanting section is not constructed at an end section on a left side in the front end section. Accordingly, in case that the case 2 is inserted, by means of the slanting section 2a of the case 2, the bend section 9a of the helical torsion coil spring 6 is introduced into the groove 4a and is pushed to a right side of the case 2. However, since a slanting section is not constructed on a left side in the front end section of the case 2, the bend section 9b of the helical torsion coil spring 6 cannot be pushed to a left side. Namely, since the bend section 9b of the helical torsion coil spring 6 is not displaced, this becomes to be an obstacle for the insertion of the case 2, and the case 2 cannot be pushed into the insertion section 3 more.

In other words, if the above-described mechanism is adopted, although the case 1 of the ZIP can be inserted, the case 2 of the floppy disk cannot be inserted., Namely, error insertion of different types of media is prevented.

Also, during insertion wherein the ZIP case 1 is being inserted into the insertion section 3, side surfaces on both sides of the ZIP case 1 are firmly sandwiched by the arm sections 8a and 8b and the bend sections 9a and 9b on both sides of the helical torsion coil spring 6. Accordingly, when the ZIP case 1 is taken out from the insertion section 3, even though the case 1 is constructed so as to be pushed out by means of a spring, since action (friction force) opposed to pushing-out force by means of the spring can be obtained from the helical torsion coil spring 6, an accident that the case jumps out vigorously is difficult to occur.

Furthermore, if the helical torsion coil spring 6 is constructed so as to take a ground, static electricity that is charged in the case 1 can be discharged via the helical torsion coil spring 6, and breakdown by means of the static electricity can be prevented.

Figure 3:
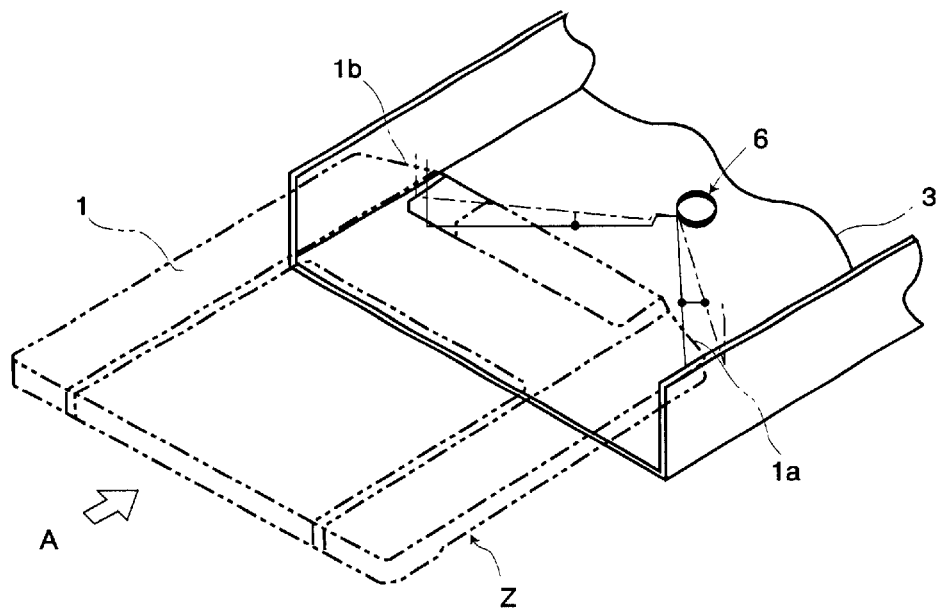
FIG. 3 is a schematic oblique view showing a second embodiment of the present invention during insertion of a ZIP.

FIG. 3 is a schematic oblique view showing main parts of a second embodiment of a driving apparatus for a recording medium in the shape of a disc, which is related to the present invention.

Since the second embodiment is different from the first embodiment only as to whether the helical torsion coil spring 6 is provided from a lower side of the insertion section 3 or it is provided from an upper side of the insertion section 3, detailed explanation thereof is omitted.

Figure 4:
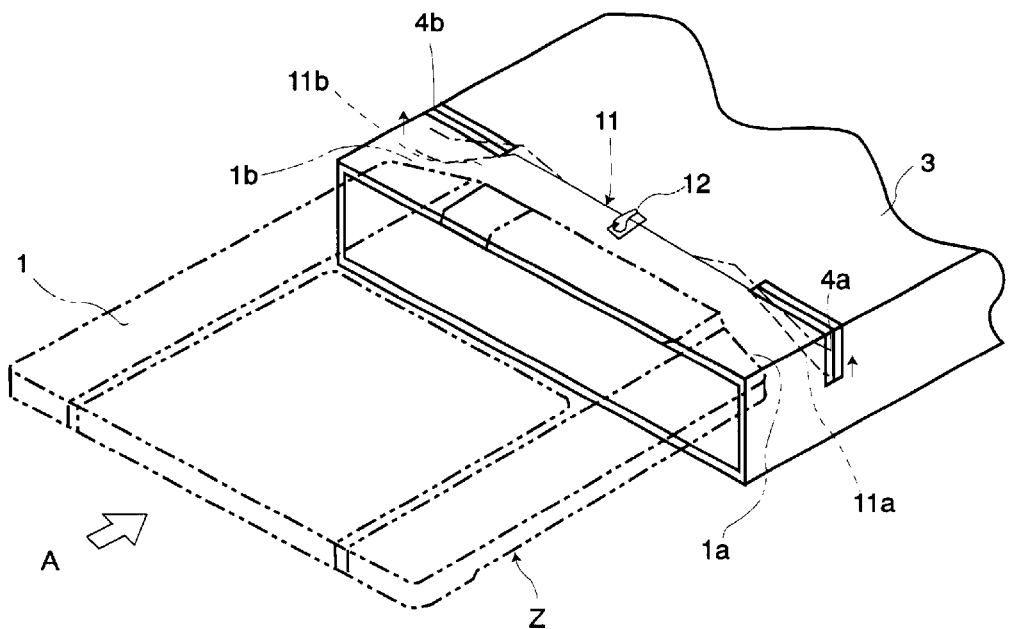
FIG. 4 is a schematic oblique view showing a third embodiment of the present invention during insertion of a ZIP.

FIG. 4 is a schematic oblique view showing main parts of a third embodiment of a driving apparatus for a recording medium in the shape of a disc, which is related to the present invention.

Differences between this embodiment and the first embodiment are only in points of a kind of a spring that will be a stopper, a structure for attachment of a spring, and a manner of operation of the spring.

In other words, a center section of a spring 11 generally in the shape of a letter V is fixed by means of a hook 12 provided in a top surface section of an insertion section 3, and end sections 11a and 11b on both sides of the spring 11 generally in the shape of a letter V are placed so as to be positioned within grooves 4a and 4b.

Under such an arrangement also, although the case 1 of the ZIP can be inserted, the case 2 of the floppy disk cannot be inserted. Namely, error insertion of different types of media is prevented. In other words, when the ZIP is inserted into the insertion section 3, the slanting sections 1a and 1b of the both end sections on both sides in the front end section of the case 1 exist at positions corresponding to the slanting sections 1a and 1b without fail, and become to push up to an upper side (push up to an upper side with respect to a main surface of the case) the end sections 11a and 11b on both sides of the spring 11 positioned within the grooves 4a and 4b. As a result, since components for blocking the insertion of the case 1 are excluded from an inside of the insertion section 3, the case 1 can be pushed into the insertion section 3. It would be noted that, in FIG. 4, a locus of the displacement of the spring 11 is shown by an alternate long and short dash line.

However, in case that the floppy disk is inserted, the insertion thereof is blocked. In other words, in the case 2 of the floppy disk, although the slanting section 2a is constructed at the end section on a right side in the front end section thereof, a slanting section is not constructed at an end section on a left side in the front end section. Accordingly, in case that the case 2 is inserted, by means of the slanting section 2a of the case 2, the right end section 11a of the spring 11 is introduced into the groove 4a and is pushed up to an upper side of the case 2. However, since a slanting section is not constructed on a left side in the front end section of the case 2, the left end section 11b of the spring 11 cannot be pushed up to an upper side. Namely, since the left end section 11b of the spring 11 is not displaced, this becomes to be an obstacle for the insertion of the case 2, and the case 2 cannot be pushed into the insertion section 3 more.

As explained above, in accordance with the present invention, for example, although the ZIP can be inserted, the floppy disk of 3.5 inches cannot be inserted, and accordingly, error insertion can be prevented.

The entire disclosure of Japanese Patent Application No. 11-174727 filed on Jun. 21, 1999 including specification, claims, drawing and summary are incorporated herein by reference in its entirety.

What is claimed Is:

1. A driving apparatus for a recording medium, wherein said recording medium is accommodated within a case,
said case is adapted so that slanting sections are constructed at both end sections in a front end section that is on a side of insertion into said driving apparatus,
in said driving apparatus, stoppers for preventing error insertion are provided in correspondence with said slanting sections of said case, which are constructed at said both end sections in said front end section, and
said stoppers are constructed so that,
in case that said case in which said slanting sections are constructed at said both end sections in said front end section is inserted into said driving apparatus, said stoppers are subject to release action by means of said slanting sections of said both end sections in said front end section of said case, and permit insertion of said case, and
in case that a case in which slanting sections are not constructed at least one end section
in a front end section is inserted, said stoppers cannot be subject to release action by means of said slanting sections, and do not permit insertion of said case.

2. A driving apparatus for a recording medium according to claim 1, wherein said stoppers are formed of an elastic rebound member, and are constructed so that, in case that said case in which said slanting sections are constructed at said both end sections in said front end section is inserted, both end sections of said elastic rebound stoppers are subject to force opposed to elastic rebound force by means of said slanting sections at said both end sections in said front end section of said case, and are displaced, and insertion of said case is permitted, and in case that a case in which slanting sections are not constructed at least one end section in a front end section is inserted, at least one end section of said elastic rebound stoppers is not displaced, and insertion of said case is not permitted.

3. A driving apparatus for a recording medium according to claim 2, wherein, in case that said case in which said slanting sections are constructed at said both end sections in said front end section is inserted into said driving apparatus, when said both end sections of said stoppers are subject to force opposed to elastic rebound force by means of said slanting sections at said both end sections in said front end section of said case, and are displaced, guide means for guiding displacement of said both end sections of said stoppers is formed.

4. A driving apparatus for a recording medium according to claim 3, wherein said stoppers are formed of an elastic rebound member, and said elastic rebound stoppers are generally formed in a shape of a letter V, and said both end sections of said stoppers are placed within grooves formed in a direction intersecting to a direction of insertion of said case into said driving apparatus.

5. A driving apparatus for a recording medium according to claim 3, wherein said stoppers are formed of an elastic rebound member, and said elastic rebound stoppers are generally formed in a shape of a letter V, and is constructed so that said both end sections of said stoppers are displaced in an outside direction on both sides of said case to a direction of insertion of said case into said driving apparatus.

6. A driving apparatus for a recording medium according to claim 3, wherein said stoppers are formed of an elastic rebound member, and said elastic rebound stoppers are generally formed in a, shape of a letter V, and is constructed so that said both end sections of said stoppers are displaced in an upper or a lower direction to a surface of said case to be inserted into said driving apparatus.

7. A driving apparatus for a recording medium according to claim 2, wherein said stoppers are formed of an elastic rebound member, and said elastic rebound stoppers are generally formed in a shape of a letter V, and said both end sections of said stoppers are placed within grooves formed in a direction intersecting to a direction of insertion of said case into said driving apparatus.

8. A driving apparatus for a recording medium according to claim 2, wherein said stoppers are formed of an elastic rebound member, and said elastic rebound stoppers are generally formed in a shape of a letter V, and is constructed so that said both end sections of said stoppers are displaced in an outside direction on both sides of said case to a direction of insertion of said case into said driving apparatus.

9. A driving apparatus for a recording medium according to claim 2, wherein said stoppers are formed of an elastic rebound member, and said elastic rebound stoppers are generally formed in a shape of a letter V, and is constructed so that said both end sections of said stoppers are displaced in an upper or a lower direction to a surface of said case to be inserted into said driving apparatus.

10. A driving apparatus for a recording medium according to claim 1, wherein, in case that said case in which said slanting sections are constructed at said both end sections in said front end section is inserted into said driving apparatus, when said both end sections of said stoppers are subject to force opposed to elastic rebound force by means of said slanting sections at said both end sections in said front end section of said case, and are displaced, guide means for guiding displacement of said both end sections of said stoppers is formed.

11. A driving apparatus for a recording medium according to claim 10, wherein said stoppers are formed of an elastic rebound member, and said elastic rebound stoppers are generally formed in a shape of a letter V, and said both end sections of said stoppers are placed within grooves formed in a direction intersecting to a direction of insertion of said case into said driving apparatus.

12. A driving apparatus for a recording medium according to claim 10, wherein said stoppers are formed of an elastic rebound member, and said elastic rebound stoppers are generally formed in a shape of a letter V, and is constructed so that said both end sections of said stoppers are displaced in an outside direction on both sides of said case to a direction of insertion of said case into said driving apparatus.

13. A driving apparatus for a recording medium according to claim 10, wherein said stoppers are formed of an elastic rebound member, and said elastic rebound stoppers are generally formed in a shape of a letter V, and is constructed so that said both end sections of said stoppers are displaced in an upper or a lower direction to a surface of said case to be inserted into said driving apparatus.

14. A driving apparatus for a recording medium according to claim 1, wherein said stoppers are formed of an elastic rebound member, and said elastic rebound stoppers are generally formed in a shape of a letter V, and said both end sections of said stoppers are placed within grooves formed in a direction intersecting to a direction of insertion of said case into said driving apparatus.

15. A driving apparatus for a recording medium according to claim 1, wherein said stoppers are formed of an elastic rebound member, and said elastic rebound stoppers are generally formed in a shape of a letter V, and is constructed so that said both end sections of said stoppers are displaced in an outside direction on both sides of said case to a direction of insertion of said case into said driving apparatus.

16. A driving apparatus for a recording medium according to claim 1, wherein said stoppers are formed of an elastic rebound member, and said elastic rebound stoppers are generally formed in a shape of a letter V, and is constructed so that said both end sections of said stoppers are displaced in an upper or a lower direction to a surface of said case to be inserted into said driving apparatus.

17. A driving apparatus for a recording medium, wherein said recording medium is accommodated within a case, said case is adapted so that slanting sections are constructed at both end sections in a front end section that is on a side of insertion into said driving apparatus, in said driving apparatus,
stoppers for preventing error insertion are provided in correspondence with said slanting sections of said case, which are constructed at said both end sections in said front end section, and
further, in case that said case is inserted into said driving apparatus, when said both end sections of said stoppers are subject to force opposed to elastic rebound force by means of said slanting sections at said both end sections in said front end section of said case, and are displaced, grooves for guiding displacement of said both end sections of said stoppers is provided in a direction intersecting to a direction of insertion of said case into said driving apparatus, and
said stoppers are formed of an elastic rebound member, and said elastic rebound stoppers are generally formed in a shape of a letter V, and said both end sections of said stoppers are placed within said grooves, and
said stoppers are constructed so that,
in case that said case is inserted into said driving apparatus, said stoppers are subject to release action by means of said slanting sections of said both end sections in said front end section of said case, and permit insertion of said case, and
in case that a case in which slanting sections are not constructed at least one end section in a front end section is inserted, said stoppers cannot be subject to release action by means of said slanting sections, and do not permit insertion of said case.

18. A driving apparatus for a recording medium, wherein said recording medium is accommodated within a case, said case is adapted so that slanting sections are constructed at both end sections in a front end section that is on a side of insertion into said driving apparatus, in said driving apparatus,
stoppers for preventing error insertion are provided in correspondence with said slanting sections of said case, and
further, in case that said case is inserted into said driving apparatus, when said both end sections of said stoppers are subject to force opposed to elastic rebound force by means of said slanting sections at said both end sections in said front end section of said case, and are displaced, grooves for guiding displacement of said both end sections of said stoppers are provided in a direction intersecting to a direction of insertion of said case into said driving apparatus, and
said stoppers are formed of an elastic rebound member, and said elastic rebound stoppers are generally formed in a shape of a letter V, and said both end sections of said stoppers are placed within said grooves so as to be displaced in an outside direction on both sides of said case to a direction of insertion of said case into said driving apparatus, and
said stoppers are constructed so that,
in case that said case is inserted into said driving apparatus, said stoppers are subject to release action by means of said slanting sections of said both end sections in said front end section of said case, and permit insertion of said case, and
in case that a case in which slanting sections are not constructed at least one end section in a front end section is inserted, said stoppers cannot be subject to release action by means of said slanting sections, and do not permit insertion of said case.

19. A driving apparatus for a recording medium, wherein said recording medium is accommodated within a case, said case is adapted so that slanting sections are constructed at both end sections in a front end section that is on a side of insertion into said driving apparatus, in said driving apparatus,
stoppers for preventing error insertion are provided in correspondence with said slanting sections of said case, and
further, in case that said case is inserted into said driving apparatus, when said both end sections of said stoppers are subject to force opposed to elastic rebound force by means of said slanting sections at said both end sections in said front end section of said case, and are displaced, grooves for guiding displacement of said both end sections of said stoppers are provided in a direction intersecting to a direction of insertion of said case into said driving apparatus, and said stoppers are formed of an elastic rebound member, and said elastic rebound stoppers are generally formed in a shape of a letter V, and said both end sections of said stoppers are placed within said grooves so as to be displaced in an upper or a lower direction to a surface of said case to be inserted into said driving apparatus, and said stoppers are constructed so that,
  in case that said case is inserted into said driving apparatus, said stoppers are subject to release action by means of said slanting sections of said both end sections in said front end section of said case, and permit insertion of said case, and
  in case that a case in which slanting sections are not constructed at least one end section in a front end section is inserted, said stoppers cannot be subject to release action by means of said slanting sections, and do not permit insertion of said case.

20. A driving method for a recording medium accommodated within a case, said case being adapted so that slanting sections are constructed at both end sections in a front end section that is on a side of insertion into a driving apparatus, said method comprising steps of:
  providing stoppers for preventing error insertion, in correspondence with said slanting sections of said case; and
  in case that said case is inserted into said driving apparatus, and said stoppers are subject to release action by means of said slanting sections of said both end sections in said front end section of said case, permitting insertion of said case, and in case that a case in which slanting sections are not constructed at least one end section in a front end section is inserted, and said stoppers cannot be subject to release action by means of said slanting sections, prohibiting insertion of said case.

21. A driving method for a recording medium accommodated within a case, said case being adapted so that slanting sections are constructed at both end sections in a front end section that is on a side of insertion into a driving apparatus, said method comprising steps of:
  providing stoppers for preventing error insertion, in correspondence with said slanting sections of said case, and said stoppers being formed of an elastic rebound member, and said elastic rebound stoppers being generally formed in a shape of a letter V;
  in case that said case is inserted into said driving apparatus, when said both end sections of said stoppers are subject to force opposed to elastic rebound force by means of said slanting sections at said both end sections in said front end section of said case, and are displaced, providing grooves for guiding displacement of said both end sections of said stoppers in a direction intersecting to a direction of insertion of said case into said driving apparatus, and said both end sections of said stoppers being placed within said grooves; and
  in case that said case is inserted into said driving apparatus, and said stoppers are subject to release action by means of said slanting sections of said both end sections in said front end section of said case, permitting insertion of said case, and in case that a case in which slanting sections are not constructed at least one end section in a front end section is inserted, and said stoppers cannot be subject to release action by means of said slanting sections, prohibiting insertion of said case.

22. A driving method for a recording medium accommodated within a case, said case being adapted so that slanting sections are constructed at both end sections in a front end section that is on a side of insertion into a driving apparatus, said method comprising steps of:
  providing stoppers for preventing error insertion, in correspondence with said slanting sections of said case, said stoppers being formed of an elastic rebound member, and said elastic rebound stoppers, being generally formed in a shape of a letter V;
  in case that said case is inserted into said driving apparatus, when said both end sections of said stoppers are subject to force opposed to elastic rebound force by means of said slanting sections at said both end sections in said front end section of said case, and are displaced, providing grooves for guiding displacement of said both end sections of said stoppers in a direction intersecting to a direction of insertion of said case into said driving apparatus, and said both end sections of said stoppers being placed within said grooves so as to be displaced in an outside direction on both sides of said case to a direction of insertion of said case into said driving apparatus; and
  in case that said case is inserted into said driving apparatus, and said stoppers are subject to release saction by means of said slanting sections of said both end sections in said front end section of said case, permitting insertion of said case, and in case that a case in which slanting sections are not constructed at least one end section in a front end section is inserted, and said stoppers cannot be subject to release action by means of said slanting sections, prohibiting in sertion of said case.

23. A driving method for a recording medium accommodated within a case, said case being adapted so that slanting sections are constructed at both end sections in a front end section that is on a side of insertion into a driving apparatus, said method comprising steps of:
  providing stoppers for preventing error insertion, in correspondence with said slanting sections of said case, said stoppers being formed of an elastic rebound member, and said elastic rebound stoppers being generally formed in a shape of a letter V;
  in case that said case is inserted into said driving apparatus, when said both end sections of said stoppers are subject to force opposed to elastic rebound force by means of said slanting sections at said both end sections in said front end section of said case, and are displaced, providing grooves for guiding displacement of said both end sections of said stoppers in a direction intersecting to a direction of insertion of said case into said driving apparatus, and said both end sections of said stoppers are placed within said grooves so as to be displaced in an upper or a lower direction to a surface of said case to be inserted into said driving apparatus; and
  in case that said case is inserted into said driving apparatus, and said stoppers are subject to release action by means of said slanting sections of said both end sections in said front end section of said case, permitting insertion of said case, and in case that a case in which slanting sections are not constructed at least one end section in a front end section is inserted, and said stoppers cannot be subject to release action by means of said slanting sections, prohibiting insertion of said case.

* * * * *

UNITED STATES PATENT AND TRADEMARK OFFICE
CERTIFICATE OF CORRECTION

PATENT NO. : 6,504,809 B1
DATED : January 7, 2003
INVENTOR(S) : Koji Takeda, Hideo Sekiguchi and Yoshimori Tajima It is certified that error appears in the above-identified patent and that said Letters Patent is hereby corrected as shown below:

Column 12,
Line 34, delete "saction" insert -- action --
Line 41, delete "sertion" insert -- insertion --

Signed and Sealed this

Nineteenth Day of August, 2003

JAMES E. ROGAN
*Director of the United States Patent and Trademark Office*